July 26, 1955  J. R. ROBERTS  2,714,072
MOLDABLE CELLULOSE COMPOSITION CONTAINING PINE
WOOD RESIN AND MOLDED PRODUCT MADE THEREFROM
Filed Oct. 13, 1952

COMMINUTED CELLULOSE MATERIAL

MIX WITH AT LEAST ABOUT 10%, PREFERABLY BETWEEN
ABOUT 20% AND ABOUT 40% BY WEIGHT THERMOPLASTIC
PINE WOOD RESIN CHARACTERIZED AS FOLLOWS:

| | |
|---|---|
| GASOLINE INSOLUBLE CONTENT (BY WEIGHT) | 30- 80 % |
| ACID NUMBER | 105-140 |
| MELTING POINT (HERCULES DROP METHOD) | 175-210° F. |

MOLDABLE MIXTURE

FELT INTO PRESELECTED SHAPE

SHAPED FELT

HOT PRESS UNDER THE FOLLOWING CONDITIONS:

| | |
|---|---|
| CELLULOSE MOISTURE CONTENT BY WEIGHT | 10 - 25 % |
| PRESS TEMPERATURE | 250-400 °F. |
| PRESS TIME | 1/4 - 15 MINUTES |
| PRESS PRESSURE | 200-500 psi |

MOLDED PRODUCT

*INVENTOR.*
James R. Roberts
BY
Atty.

United States Patent Office 2,714,072
Patented July 26, 1955

2,714,072

MOLDABLE CELLULOSE COMPOSITION CONTAINING PINE WOOD RESIN AND MOLDED PRODUCT MADE THEREFROM

James R. Roberts, Longview, Wash., assignor to Weyerhaeuser Timber Company, Tacoma, Wash., a corporation of Washington Application October 13, 1952, Serial No. 314,553

6 Claims. (Cl. 106—200)

This invention relates to a moldable cellulose composition, specifically the composition comprising comminuted cellulose material and pine wood resin, and to the molded product when it is consolidated by the application of heat and pressure.

It is well known in the art of preparing molding compositions to formulate compositions consisting entirely or almost entirely of a selected thermosetting resin. The phenol-formaldehyde casting resins are illustrative of compositions of this class. Although useful for many purposes, their use is attended by the disadvantage that the compositions themselves are costly and the molded products prepared therefrom tend to be brittle.

Molding compositions also are well known which comprise a thermoplastic or thermosetting resinous material together with a non-feltable cellulose filler such as wood flour. In compositions of this class the resinous base material is diluted by the filler, but not to the point where plastic flow is inhibited. Such compositions also have many applications, although the molded products prepared therefrom tend to be low in strength. This is because their strength is derived principally from the interparticle adhesion of the filler, rather than from a combination of such adhesion together with an interlocking of intertwined fibers which would be obtained if a mat of feltable fibers were to be employed as the base of the composition. Still further, if more than a limited amount of cellulose filler is employed in the molding compositions of this class, the molded product will have a surface of non-uniform color which does not have a mirror finish and which has present on its surface loosely bound filler particles which rub off upon handling the molded article.

It also is well known in the art of consolidating comminuted lignocellulose material to cook or treat the material with highly reactive chemicals prior to its consolidation. Chemicals commonly employed for this purpose include aniline, furfural, and many other reagents. A preliminary treatment with chemicals of this class successfully plasticizes the material so that it may be molded. However, the treatment is attended by several disadvantages, prominent among which are the facts that the cellulose material is degraded and weakened, some of the cellulose material is lost by being rendered water soluble, and a substantial item of expense is added to the molding procedure because of the necessity of including the chemical treatment as a separate operation requiring an extra investment in both equipment and chemical treating agents.

It is further known in the art of consolidating comminuted cellulose mixtures to provide such mixtures comprising a preponderant amount of cellulose fiber with a very small amount of binder and to subject the mixture to the action of heat and pressure. This procedure is employed in the fabrication of hardboard and related products. It differs from the molding procedure described above in that the primary action occurring during the hot pressing operation in board manufacture is the consolidation of the fibers and their adhesion to each other to form a hard final product of substantial density. Although such products have the advantage of being low in cost, the compositions from which they are made are not useful as molding compositions, since the cellulose-containing compositions do not possess sufficient plastic flow to permit the pressed object to conform to the contour of molds of complex design.

Hence it would be desirable to provide a moldable mixture comprising predominantly a relatively inexpensive cellulose material in admixture with a low cost binder, thereby filling the void between the expensive, conventional, plastic molding compositions containing a high proportion of binder and the relatively inexpensive but non-plastic compositions employed in hardboard manufacture. There thus could be provided a new class of moldable compositions which are relatively very low in cost but which are applicable in the fabrication of a diversity of contoured, high strength, molded articles, such as chair backs, arm rests, core pieces and other constituent parts of furniture, trays; brush handles; containers; cases for ammnuition; panels; molded automobile parts, including arm rests, dash boards, air duct work, etc.; novelty molded articles; and the like.

Many difficulties are encountered, however, in the provision of such a moldable composition. In the first place, where a relatively large proportion of uncooked cellulose material is employed as the major constituent of the mixture, the latter tends not to flow sufficiently when subjected to the action of heat and pressure. As a result, it will not fill uniformly molds of complex design, nor can it be employed in the fabrication of molded articles of both thick and thin cross section. Still further, butt and lap joints present in felted forms of such mixtures do not seal readily during the pressing operation as is required in many applications. Also, and again because of the poor flow properties of the mixtures, they cannot be used in the fabrication of deep-drawn molded articles.

In addition to the foregoing, there are many other difficulties which tend to prevent the successful use of many cellulose-containing molding compositions. With many of them the molded articles are brittle, particularly at low temperatures. In addition, they tend to be low in strength and to have poor water and solvent resistance, as well as poor abrasion resistance. Also, their surface properties tend to be poor in that the surfaces have loose surface fibers which rub off during use and are not hard, smooth and of uniform color.

Another difficulty encountered with molding mixtures of the class under consideration is the tendency of such mixtures to be coherent, sticking together and densifying during handling and transportation. As a result, it is difficult or impossible to felt them into desired shapes by any of the commonly employed techniques. Still further, such mixtures have a tendency in the press to stick to the molds with the dual adverse result that the surface of the pressed article is pitted, and a tedious mold cleaning operation is required after use of the press. Also, many such mixtures tend to bond together slowly during pressing so that a relatively long press time is required.

I now have discovered that the above and other difficulties inherent in the provision and use of moldable compositions comprising a preponderant amount of cellulose material may be overcome by mixing with such material preliminary to molding at least about 10%, preferably between about 20% and about 40%, of a specific pine wood resin which is unique among a large number of low cost binders in providing moldable compositions which are easily handled and which produce molded articles of superior properties applicable to many uses. The resulting novel composition, and the manner of its preparation and use, are illustrated in the accompanying drawing, comprising a flow plan of the invention.

The pine wood resin used in the hereindescribed composition is obtained as a by-product of rosin manufacture. As is well known, the FF color grade of rosin may be obtained from pine wood by extracting the wood with an aromatic hydrocarbon solvent such as benzene or toluene, followed by evaporation of the solvent to leave the rosin as a solid residue.

The FF rosin thus obtained is ruby-red in color and comprises a mixture of rosin, pine wood resin and color bodies. In refining it to one of the lighter color grades, for example, polypale rosin, the FF rosin is dissolved in a hot petroleum hydrocarbon solvent, such as petroleum naphtha, petroleum ether, or gasoline. To the gasoline solution is added a quantity of a selective solvent for the resin and color bodies. Furfural is a preferred example of such a solvent, although other solvents including furfuryl alcohol, phenol, sulfur dioxide, resorcinol, etc. may be employed.

The furfural or other solvent layer then is separated from the gasoline layer and distilled to recover the furfural. This leaves as a residue the pine wood resin mixed with color bodies, which residue is the resinous material employed in the present invention. The gasoline layer may be distilled for recovery of the solvent, leaving as a residue the purified rosin of light color.

Alternatively, the hot gasoline solution of FF resin may be purified by contacting it with a solid adsorbing material such as clay or fuller's earth, which acts as a selective adsorbent for the pine wood resin desired for the purposes of the present invention. The resin then may be recovered from the adsorbent by washing with solvent or otherwise.

The pine wood resin obtained by the above described methods is a dark colored material having the following approximate properties (percent being expressed as percent by weight):

| | |
|---|---|
| Acid number | 105–140 |
| Saponification number | 150–170 |
| Melting point (Hercules drop method) °F | 175–210 |
| Unsaponifiable matter percent | 10–20 |
| Gasoline insoluble do | 30–80 |
| Petroleum ether insoluble do | 30–80 |

Although the chemical composition of the pine wood resin has not been completely established, it contains, as noted above, most of the color bodies of the original FF rosin as well as a large proportion of the unsaponifiable materials. There also is present a substantial proportion of acidic materials and oxidized rosin acids.

The non-rosin fraction of pine wood extract which has been discovered by me to be uniquely suited for the production of a low cost moldable composition thus is clearly distinguishable both from rosin itself and from the resinous product also obtained from rosin manufacture and sold by the Hercules Powder Co. under the trade name of "Vinsol" resin. It distinguishes from rosin since it comprises the impurities removed therefrom during the refining operation, and also in its properties. It has a higher flow point, a much higher viscosity, a lower acid number, and a higher unsaponifiable content than does rosin.

Distinguishing it from Vinsol resin, the hereindescribed pine wood resin has a gasoline and petroleum ether insoluble content of from about 30 to about 80% by weight, whereas Vinsol resin has a gasoline and petroleum ether insoluble content of over 80%, usually over 90% by weight. Also, whereas the pine wood resin has a saponification number of from about 150 to about 170, Vinsol has a saponification number of between about 135 and about 145. Still further, although the melting point of the pine wood resin is from about 175 to about 210° F., that of Vinsol lies within the range of from about 220 to about 260° F. Hence, it is apparent that the presently described pine wood resin has an inherently different composition from that of either rosin or Vinsol, and it undoubtedly is this fact that lends to the resin its unique and highly desirable properties as a constituent of moldable cellulose compositions.

Various cellulose materials in finely divided form may be employed together with the pine wood resin in the formulation of the moldable compositions of the present invention. Suitable materials include sawdust, wood shavings, wood flour, and the various chemically produced cellulose pulps, although it is preferred to employ defiberized lignocellulose. This may be derived from any suitable source such as cane, straw, bagasse, maize, grasses, corncobs and the like, but preferably is derived from the wood of trees of various species.

A variety of devices may be employed to reduce the wood to the form of small particles. Suitable machines for this purpose include the MacMillan defibrator, the Bauer defibrator or the Allis-Chalmers interplane grinder, which have as their function the reduction of wood to fibrous form.

A preferred means of reducing the wood for the purpose of the present invention however, is by means of the Asplund defibrator. In this device the wood is subjected to a preliminary treatment with steam at a pressure of between about 80 and about 160 p. s. i. g. for a time of from about ½ to about 6 minutes, thereby softening the lignin. While in this steam environment, the wood is subjected to a rubbing, abrading action between metal discs. This reduces the softened wood to fibers having a size distribution determined by the adjustment of the discs. The resulting fiber then is discharged to the atmosphere through an orifice.

In this manner there is produced the Asplund fiber which is particularly suited to the purposes of the present invention for a variety of reasons. In the first place, the wood fibers are rendered soft and pliable and the binder is softened within the machine so that these two constituents may be mixed together efficiently. Secondly, the Asplund fiber is of relatively small uniform particle size which leads to uniformity in product properties. Third, the product contains a high content of ultimate fibers and of flexible fiber bundles which are feltable and produce structural strength in products made therefrom. Fourth, the product contains a minimum amount of broken fibers and of woody chunks and slivers, and for this reason also may be employed in the production of molded articles of enhanced strength characteristics. Fifth, the binder is distributed uniformly over the fiber surfaces and the extent of its penetration into the fibers is controlled. These factors still further increase the strength of the molded products.

Sixth, the Asplund fibers are obtained in high yield and contain all of the water soluble content of the wood. As a consequence, they also contain all of the native or autogeneously developed binder which may be found in or derived from the woody substance and this cooperates with the added binder in producing strong molded products. Also, the Asplund fiber has a relatively low water content and therefore requires a minimum of drying in the press during the molding operation. As a result of all these factors, there may be produced in the Asplund defibrator a non-coherent mixture of fiber and binder which is easily handled, stored, transported, felted and pressed into a variety of molded products.

In formulating the hereindescribed moldable compositions the pine wood resin binder and the cellulose material may be used in amounts determined by the properties desired in the composition and the use contemplated for the molded products made therefrom. In general, however, a sufficient amount of binder should be employed to impart thermoplastic properties to the mixture so that when the latter is molded hot, the cellulose particles will be so lubricated by the softened binder that plastic flow, or at least fiber slippage, occurs, enabling filling of the mold. This lower limit is about 10% by weight based on the dry weight of the molding composition. It clearly distinguishes the moldable compositions which are the subject matter of the present invention from the hardboard fabricating compositions which are not characterized by plastic flow, the binder serving a bonding function only, and which contain only a small amount of binder, usually less than about 5% by weight.

The upper limit of binder usage for the present purpose comprises the amount required for adequate lubrication of the cellulose fibers and void filling without reduction of the strength-enhancing intertwining of the fibers through dilution of the fiber mixture with binder. Thus a sufficient amount of binder should be employed to provide a composition which will be susceptible to deep drawing techniques, where it is desired to use them, which will fill uniformly molds of complex contour, and which will be characterized by self-sealing of butt and lap joints present in the blank to be pressed. In practice these requirements usually are met by compositions containing between about 20% and about 40% by weight of binder.

The pine wood resin binder may be applied to the cellulose base material and mixed therewith by any suitable method, as by spraying it on the material in molten form or dissolved in a suitable solvent while agitating the mass in a mixer or mill of suitable design. Where the cellulose material is provided initially in the form of wood chips, the binder may be applied to advantage prior to the reduction of the chips to fiber or particle form, or contemporaneously therewith. In this manner, the binder may be distributed throughout the mass by the means employed in reducing the wood, forming a product wherein the binder is distributed uniformly on the surfaces of individualized fibers.

In addition to binder, there may be added to the cellulose material suitable amounts of other agents such as fire-proofing and vermin proofing agents, sizing materials, plasticizers, dyes and the like. These may be incorporated in the mixture contemporaneously with the wood reducing operation or subsequently thereto by any suitable method.

The foregoing procedure results in the provision of a moldable mixture which is ready for shaping or felting into a desired shape. Although this may be effectuated by any suitable wet-, dry- or moist-felting technique, it is preferred to preform the material into the desired shape in a felting jig, provided with appropriately located screens to direct the placement of the molding mixture and to permit the escape of air. Thus a weighed quantity of the mixture may be introduced into a high-speed, paddle type fan capable of producing the air pressure required by the design and volume of the preform to be made. It then may be blown into the forming jig to produce the preform or felt.

The preform then is subjected to a consolidating operation with or without having been subjected to a preliminary treatment with steam or humidified hot air to soften the fibers and binder and to render them more amendable to pressing. The pressing pressure, the pressing temperature, and the press dwell time are determined by such factors as the character of the wood fiber employed, the proportion of binder in the mixture, the thickness of the felt, the density of the molded piece, the complexity of the mold, etc. In general, however, it has been found that with the particular moldable composition of this invention a molded product of optimum strength, water resistance and surface properties is obtained when the felt being pressed has a fiber moisture content of from about 10 to about 25% by weight and the press temperature is between about 250 and about 400° F., the press pressure between about 200 and about 500 p. s. i. and the press dwell time between about ¼ minute and about 15 minutes. After the pressing operation has been completed, the molded article may be removed with or without first cooling the mold.

The present invention is further illustrated in the following examples wherein parts are given as parts by weight.

*Example I*

Molded articles were made by defiberizing wood in an Asplund defibrator, 30% pine wood resin having a gasoline insoluble content of from 30 to 80% by weight being added upstream from the discs. The resulting non-coherent, feltable, fibrous mass was entrained in a stream of air and blown into a forming jig of the desired contour. The form then was hot pressed at a temperature of about 300° F. to a density of 75 pounds per cubic foot. The molded product separated readily from the mold and had good surface properties. Its modulus of rupture was 8600 p. s. i., its impact strength 1.60 foot pounds per inch, its water absorption 11% and its swelling 6% (24 hour soak).

*Example II*

Furniture components having a double bend and a lap joint were made by introducing 40% by weight pine wood resin having a gasoline insoluble content of from 30 to 80% into an Asplund defibrator, felting the discharged resin coated fiber dry in an appropriate form and pressing the resulting felt at a temperature of 300° F. and a pressure of 200 p. s. i. The resulting product conformed to the mold, had good surface properties, a rupture modulus of 5800 p. s. i. and a water absorption (thickness swelling, 24 hour soak time) of 2.2%.

*Example III*

This example illustrates the application of the herein described moldable compositions under a variety of pressing conditions.

Defiberized wood was mixed with 30% by weight pine wood resin having a gasoline insoluble content of 30 to 80%, and the resulting fiber dry felted into mats which then were hot pressed into panels at a fiber moisture content of 20%, a press temperature of 325° F., a press time of 5 minutes, and the indicated pressures. The results were as follows:

| Pressure (p. s. i.) | Flexural Strength (lbs./sq. inch) | Impact (ft. lbs./ in.) | Water Absorption (percent) | Swelling (percent) |
|---|---|---|---|---|
| 50 | 1,640 | 1.73 | 54.2 | 19.0 |
| 100 | 4,060 | 1.58 | 24.0 | 12.4 |
| 200 | 9,230 | 1.27 | 9.8 | 5.8 |
| 400 | 10,490 | 2.01 | 8.6 | 5.4 |
| 800 | 11,440 | 3.45 | 9.8 | 4.9 |

*Example IV*

Molded ash trays were made by forming pneumatically into flat mats Asplund fiber mixed with 30% pine wood resin having a gasoline insoluble content of from 30 to 80% by weight. The resulting mats were steamed for 10 seconds at a steam pressure of 130 p. s. i. g. to a final total moisture content of 17.6%. They were immediately prepressed to a density of 13 pounds per square foot, after which they were hot pressed at 325° F. to a density of 62.5 pounds per cubic foot. As an alternate procedure the steamed blanks prepared as indicated above were transferred to a mold, heated to 110° F. and stamp pressed for 1 minute, the product being removed from the mold without cooling. In this case the final product had a density of 54.5 pounds per cubic foot.

The product from each of the foregoing procedures had a diameter of about 10.16 cm. The radius of curvature of the surface between the bottom of the dished portion and the side walls thereof was about 15 mm. whereas the radius of curvature of the surface between the lip portion and the dished portion was about 8 mm. The trays were uniformly contoured, free from cracks and delaminations, and had smooth uniform surfaces.

Thus it will be apparent that by the present invention I have provided a moldable cellulose composition comprising predominantly cellulose material which is relatively very low in cost and available in reproducible quality and large quantity. The composition is moldable even though the cellulose base material has not been subjected to a preliminary plasticizing treatment by reacting it with chemical reagents. The composition prior to molding is non-coherent and may be baled for transportation and subsequently fluffed and felted into any one of numerous desired shapes.

When subjected to heat and pressure, the compositions of my invention are characterized by adequate flow properties and a high degree of contourability. They may be molded easily and quickly into objects of thick and thin cross-section and during the molding operation any lap and butt joints which may be present in the felt are self-sealed. They may be formed into a flat felt which may be deep-drawn on pressing. Upon being hot pressed, they do not stick to the mold.

The molded products produced from the hereindescribed compositions are also characterized by several advantageous qualities. Thus they are not brittle at low temperatures. They have adequate strength. They are highly resistant to abrasion and to the action of solvents. Also, all the constitutent fibers are securely anchored in place, thereby imparting desirable surface properties to the molded product.

Having thus described my invention in preferred embodiments, I claim as new and desire to protect by Letters Patent:

1. The moldable composition comprising a mixture of comminuted cellulose material and at least about 10% by weight, based on the dry weight of the mixture, of the thermoplastic pine wood resin derived from the solvent refining of crude rosin and having a gasoline insoluble content of from about 30% to about 80% by weight, an acid number of between about 105 and about 140, and a melting point (Hercules drop method) of between about 175° F. and about 210° F.

2. The moldable composition comprising a mixture of defiberized lignocellulose and from about 20% to about 40% by weight, based on the dry weight of the mixture, of the theromplastic pine wood resin derived from the solvent refining of crude rosin and having a gasoline insoluble content of from about 30% to about 80% by weight, an acid number of between about 105 and about 140, and a melting point (Hercules drop method) of between about 175° F. and about 210° F.

3. The moldable composition comprising a mixture of defiberized wood produced by subjecting pieces of wood to the action of steam at a pressure of between about 80 and about 160 p. s. i. g. for a time of between about ½ and about 6 minutes and rubbing and abrading the wood while in the steam environment to reduce it to the form of individualized fibers, the defiberized wood being mixed with between about 20% and about 40% by weight based on the dry weight of the mixture, of the thermoplastic pine wood resin derived from the solvent refining of crude rosin and having a gasoline insoluble content of from about 30% to about 80% by weight, an acid number of between about 105 and about 140, and a melting point (Hercules drop method) of between about 175° F. and about 210° F.

4. The molded product comprising a hot-consolidated mixture of comminuted cellulose material and at least about 10% by weight based upon the dry weight of the mixture of the thermoplastic pine wood resin derived from the solvent refining of crude rosin and having a gasoline insoluble content of from about 30% to about 80% by weight, an acid number of between about 105 and about 140, and a melting point (Hercules drop method) of between about 175° F. and about 210° F.

5. The molded product comprising a mixture of defiberized lignocellulose and between about 20% and about 40%, based on the dry weight of the product, of the thermoplastic pine wood resin derived from the solvent refining of crude rosin and having a gasoline insoluble content of between about 30% and about 80% by weight, an acid number of between about 105 and about 140, and a melting point (Hercules drop method) of between about 175° F. and about 210° F., the said mixture having been consolidated by the application of heat and pressure.

6. The molded product comprising a mixture of defiberized wood produced by subjecting wood pieces to the action of steam at between about 80 and about 160 p. s. i. g. for between about ½ and about 6 minutes and rubbing and abrading the wood while in the steam environment to reduce it to the form of individualized fibers, together with between about 20 and about 40% by weight, based on the dry weight of the product, of the thermoplastic pine wood resin derived from the solvent refining of the crude rosin, and having a gasoline insoluble content of from about 30% to about 80% by weight, an acid number of between about 105 and about 140, and a melting point (Hercules drop method) of between about 175° F. and about 210° F., the said mixture having been consolidated to a selected density by the application of heat and pressure.

References Cited in the file of this patent
UNITED STATES PATENTS

| 2,317,326 | Ehle | Apr. 20, 1943 |
| 2,553,412 | Heritage | May 15, 1951 |